United States Patent [19]

Shindo

[11] Patent Number: 4,923,761
[45] Date of Patent: May 8, 1990

[54] BEARING MATERIAL HAVING MULTIPLE LAYER THEREIN AND A METHOD OF MANUFACTURING THE SAME

[75] Inventor: Takeshi Shindo, Chiba, Japan

[73] Assignee: NDC Company, Ltd., Chiba, Japan

[21] Appl. No.: 402,992

[22] Filed: Sep. 6, 1989

Related U.S. Application Data

[63] Continuation of Ser. No. 53,655, May 26, 1987, abandoned.

[30] Foreign Application Priority Data

Oct. 29, 1986 [JP] Japan .................. 61-257694

[51] Int. Cl.$^5$ .............................................. B22F 3/10
[52] U.S. Cl. ................................ 428/550; 384/463; 384/469; 384/902; 384/910; 384/908; 384/909; 384/912; 419/2; 419/7; 419/9; 419/23; 419/27; 419/55; 428/551; 428/557; 428/564
[58] Field of Search ............ 428/550, 551, 557, 564; 384/463, 469, 902, 910, 908, 909, 912; 419/2, 7, 9, 23, 27, 55

[56] References Cited

U.S. PATENT DOCUMENTS

| | | | |
|---|---|---|---|
| 2,788,324 | 4/1957 | Mitchell | 384/902 |
| 2,995,462 | 8/1961 | Mitchell et al. | 117/8 |
| 3,145,101 | 8/1964 | Franssen | 75/201 |
| 3,376,183 | 4/1968 | Flynn et al. | 156/244 |
| 4,000,982 | 1/1977 | Veda | 29/182.3 |
| 4,121,928 | 10/1978 | Mori . | |
| 4,189,522 | 2/1980 | Mori | 428/557 |
| 4,208,472 | 6/1980 | Cho et al. | 428/550 |
| 4,214,905 | 7/1980 | Sliney . | |
| 4,361,629 | 11/1982 | Mori | 428/557 |
| 4,582,368 | 4/1986 | Fujita et al. | 384/902 |
| 4,666,787 | 5/1987 | Bickle et al. | 428/550 |
| 4,680,161 | 7/1987 | Muto | 419/55 |
| 4,732,818 | 3/1988 | Pratt et al. | 428/550 |
| 4,767,677 | 8/1988 | Kuwayama | 428/551 |

Primary Examiner—Stephen J. Lechert, Jr.
Attorney, Agent, or Firm—Sughrue, Mion, Zinn, Macpeak & Seas

[57] ABSTRACT

The invention is related to a bearing material having multiple layers therein and a method for manufacturing the same. The invention features that a bearing layer consisting mainly of an integrated resin powder is formed on a porous layer covering a back metal, such as a steel plate of like, that the integrated resin powder consists of P T F E resin precipitate and F E P resin precipitate and/or P F A resin precipitate and that each particle of the integrated resin powder is covered with Pb-Sn alloy powders.

Accordingly, the integrated resin powder independently provides a predetermined lubricating property. In addition, since these resin precipitates are in unity, it is possible to maintain excellent cavitation resistance property and load resistance property, even under severe boundary conditions.

Furthermore, since each of the integrated resin powder is covered with the Pb-Sn alloy powder, an uniform and deep penetration of the alloy powder into pores of the porous layer can be easily obtained.

6 Claims, 2 Drawing Sheets ns. No.
07/053,655 filed May 26, 1987, abandoned.

BACKGROUND OF THE INVENTION (1), Field of the invention.

This invention relates to a bearing material having multiple layers therein and a method of manufacturing the same, more particularly, to a bearing material, which is suited as a bearing material for a portion to be reciprocated under a variable load, e.g., a shock absorber of automobile, and is excellent in the cavitation resistance property, load resistance property and corrosion resistance property with respect to lubricating oil, with surface bearing layer constituted by integrated resin powders consisting mainly of tetrafluoroethylene precipitate and tetrafluoroetylene-hexafluoropropylene copolymer precipitate, and to a method of manufacturing the bearing material.

(2), Prior art.

Generally, an automobile, such as a vehicle, truck or the like, is provided with a shock absorber, such as a damper or the like. An ocillation generated by an automobile supporting spring is restrained and damped by the shock absorber, thereby enhancing operatability and safety of the automobile. The shock absorber is provided with a cylinder-piston means comprising a cylinder including a damping oil and a piston reciprocating in the cylinder.

An application of pressure on the damping oil by a reciprocation of the piston makes the damping oil to pass through an orifice formed in the piston. By a resistance arising at the time of the damping oil passing through the orifice, there arises a damping force along an axis of and rod having the piston on the end thereof, thereby resraining and damping the ocillation generated by the automobile supporting spring. A bearing having a ring-like shape thereon is disposed between the outer surface of the piston and the inner wall of the cylinder. The ring-like bearing has on its surface a bearing surface contacting with the outer surface of the piston, which makes a reciprocating movement under a variable load.

In the cylinder-piston means, there arises variable loads by such reciprocating movement of the piston, and such variable loads are applied to the bearing. Accordingly, in case of using a bearing material as the bearing of the shock absorber, the bearing material having an excellent bearing property and high mechanical strength therein is required.

To this end, there have been proposed various types of bearing materials having multiple layers therein. These bearing materials are common to consist of a back metal, such as a steel plate or the like, a porous metallic sintering layer (hereinafter referred to as porous layer) adhering to the surface of the back metal, and a bearing layer forming on the porous layer. The bearing layer consists mainly of a resin, is penetrated together with solid lubricant into pores formed between powder particles of the porous layer. Namely, as an example, in Japanese Patent Publication No. 28846/1986, the bearing material having multiple layers therein is disclosed, among which the bearing layer is formed by a resin consisting of a tetrafluoroethylene resin (hereinafter referred to as P T F E) and a copolymer of tetrafluoroethylene and hexafluoropropylene (hereinafter referred as F E P).

Also, in U.S. Pat. No. 3,376,183, a bearing material having a multiple layer therein is disclosed. As to this bearing material, the bearing layer consisting of a glass fiber or the like and a F E P resin, and is adherent to the surface of the porous layer. These resins, which are used to form the bearing layer of two conventional bearing materials, contain fluorine and therefore have small frictional coefficients and are excellent in the frictional property. Further, their lubrication property can be improved by incorporating a solid lubricant, e.g., graphite, metal sulfides, metal oxides, etc. These conventional bearing layers formed by fluorine containing resins are inferior in the wettability with respect to lubricating oil, and satisfactory results can not always be obtained in case of using as a bearing of shock absorber spring which are subjected to variable load arising by a reciprocation of the piston.

Furthermore, recently, shock absorbers are required to meet increasingly stringent lubrication conditions due to requirements, such as (1) Low viscosity lubricating oil should be used, in consideration of using the automobile at cold districts, (2) Increase of load to be supported by bearing parts of automobile, due to the fact that a reduction is required as to cost and weight of automobile.

Therefore, sometimes it happens that oil film is broken on the bearing layer of the bearing disposed shock absorbers. When the oil film breakage happens, moving parts of shock absorbers such as piston is supported under such a boundary lubrication state that a least one part of piston is in a direct contact with the surface of bearing layer, without lubricating oil, hereby increasing wear. Therefore, with conventional bearings including multiple layers as noted above, the P T F E and F E P resins constituting the bearing layer among multiple layers have large interfacial tension and are inferior in wettability with lubricating oil and it is impossible to retain lubricating oil on the surface of the bearing layer at the time of using low viscosity lubricating oil. Therefore, problems arise as to the load resisting property and wear resistance of the surface of the bearing layer. Furthermore, when there happens such boundary lubrication state that the piston or the like is in direct contact with the surface of bearing layer, bearing layer consisting of resin is worn out, so that there arises a seizure on the surface of the bearing layer.

In Japanese Patent Laid-opening specification No. 86041/1979, is disclosed that the bearing layer consists of P T F E resin powder, lead fluoride powder and Sn-Pb alloy powder and that a corrosion resistance with respect to lubricating oil can be improved by addition of tin. However, P T F E resin mainly constituting the bearing layer is chemically very inert in situ, so that there occurs no chemical reaction between P T F E and a solid lubricant such as Pb-Sn alloy powder, and also P T F E resin and Pb-Sn alloy Powder constituting the bearing layer are merely mixed together. In other words, the solid lubricant such as Pb-Sn alloy powder is not chemically coupled at all to the P T F E resin, one part of which penetrates into the porous layer.

Meanwhile, when the viscosity of lubricant is reduced in consideration of using the shock absorber at cold destricts, there occurs a phenomenon of so called cavitation, that is, gas and vapor generated from the lubricating oil strike the surface of bearing layer at high speed, and this striking waves cause wear, separation, cracks, etc. on the surface of the bearing layer. Especially, when impact waves act on the bearing layer where the Pb-Sn alloy powder is mixed with the P T F E resin as main constituent, rupture of the P T F E resin is caused to result in the separation of solid lubricant such as the Pb-Sn alloy. Corrosion proceeds from this ruptured portion.

Accordingly, a bearing material having multiple layers therein is proposed, as disclosed in Japanese Patent Laid-Opening specification No. 28016/1983, in which a tetrafluoroethylene-perfluroalkyl-vinylether copolymer ( hereinafter referred to as P F A ) is incorporated in addition to the P T F E resin, owing to enhancing a cavitation resistance property. This bearing material makes use of the fact that the P F A resin is excellent adherence-property and cavitation resistance property with respect to the porous metal. However, P F A resin, as well as P T F E resin, is inferior in the wetting property with respect to the lubrication oil. This trend is promoted by using the lubrication oil having low viscosity therein.

Further, by increasing the amount of P F A resin incorporated the frictional coefficient is increased, so that the a lubrication performance is further deteriorated.

SUMMARY OF THE INVENTION

According to the invention, there is provided a bearing material having multiple layers therein and a method of manufacturing the same, the bearing material comprising of a back metal, such as the steel plate or the like, a porous layer adhering to the back metal and bearing layer covering the porous layer, the bearing layer consisting mainly of particles of an integrated resin powder, each of which can be obtained by an integration of P T F E resin precipitate, F E P resin precipitate and /or P F A resin precipitate, each of these precipitates being formed as small particle by a simultaneous precipitation of P T F E resin powder, F E P resin powder and/or P F A resin powder.

Furthermore, powders of solid lubricant, such as Pb-Sn alloy powder, are penetrated into pores of the porous layer together with the integrated resin powder, by attaching solid lubricant powders to the surface of particle of the integrated resin powder, thereby enhancing the wettability with respect to the lubricating oil, and preventing a seizure arising under such a boundary lubricating condition that the piston is in a direct contact with the surface on the bearing layer.

DESCRIPTION OF THE PREFERRED EMBODIMENT

Figure 1:
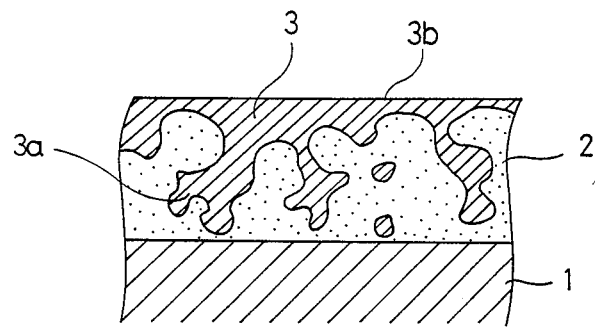
FIG. 1 is fragmentary sectional view showing an embodiment of the bearing material according to the invention.
Figure 2:
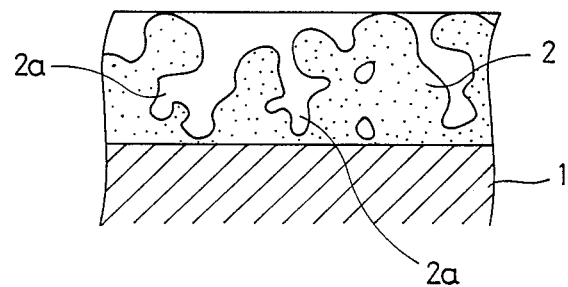
FIG. 2 is an enlarged-scale sectional view showing an example of a porous layer of the bearing layer in FIG. 1.

Refering to FIG. 1, reference numeral 1 designates a back metal, such as the steel plate or like, numeral 2 a porous layer, and numeral 3 a bearing layer. Like the prior art example, the porous layer 2 is obtained by spraying metal powder particles of Cu, Al, etc. on the back metal 1 and then sintering it in this state. Thus, as shown in FIG. 2, the porous layer 2 covers the surface of back metal 1 and has a large number of pores 2a formed among metal powder particles constituting the porous layer 2. Further, the bearing layer 3 is formed to cover the porous layer 2. A back side portion 3a of the bearing layer 3 is penetrated into large number of the pores 2a formed between metal powder particles constituting the porous layer 2. The the bearing layer 3 covers the porous layer 2 and its surface constitutes a bearing surface 3b.

Figure 3:
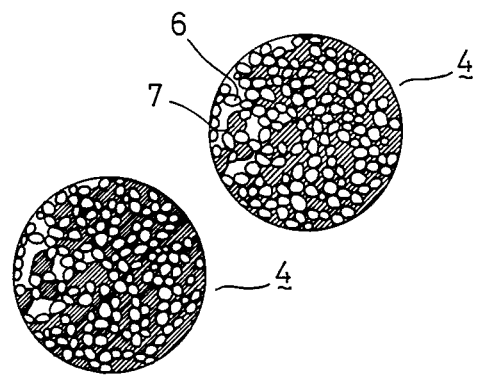
FIG. 3 is an enlarged-scale sectional view showing an example of an integrated resin powder particle constituting part of a bearing layer of the bearing material shown in Fig. 1.

The bearing layer 3 is constructed by an intgrated resin powder 4 shown in FIG. 3 and a Pb-Sn alloy powder 5 adhering to the surface of the powder 4. Namely, by a attaching Pb-Sn alloy powder 5 to the surface of each particle of the integrated resin powder 4, the Pb-Sn alloy powder 5 is penetrated into the porous layer 3 by using as a carrier the integrated resin powder 4. The integrated resin 4, as shown in FIG. 3 is comprised of small particles of P T F E resin precipitate 6 and F E P resin precipitate 7, which can be obtained by simultaneous precipitation of P T F E and F E P resins respectively, and are integrated as an united one.

In the other words, in the prior art example noted above, the bearing layer consists of F E P resin and P T F E resin, which are present in the form of independent particles respectively and are not integrated. Accordingly, the bearing layer comprising of a mixture of two resin particles is ruptured by impact waves generated at the time of cavitation, so that it is impossible to provide sufficient lubrication performance. On the other hand, the bearing layer related to this invention is formed by the integrated resin powders 4 consisting mainly of two resin precipitates 6 and 7, which are integrated as one unity. Accordingly, the integrated resin particles are not ruptured even when they are exerted by impact waves, and sufficient lubrication performance can be obtained.

Summing up, in each particle of the integrated resin powder 4, two resin precipitates 6 and 7 are not mixed together as independent particles, but the two resin precipitates 6 and 7 are integrated to form one particle of the integrated resin powder 4, in which two resin precipitates 6 and 7 are uniformly dispersed.

In case of obtaining such integrated powders 4, there is provided with an emulsion, in which exist primary particles (with diameter of 0.2 to 0.4µ) of P T F E resin and F E P resin and/or P F A resin. Then, by chemical treatment of the emulsion, simultaneous precipitation of primary particles is carried out, so that the integrated resin powders 4 are formed as secondary particle. Namely, in the integrated resin powder 4 corresponding to secondary particle having diameter of 300 to 600µ, two resin precipitates 6, 7 of primary particle having diameter of 0.2 to 0.4µ are homogeniously mixed and also integrated as one unity.

In this case, uniform dispersion of F E P resin precipitate into P T F E resin precipitate is preferable. This is because of enhancing the effect of addition of F E P resin and improving mechanical strength and wear resistance of the P T F E resin precipitate.

Furthermore, to prevent a seizure arising on the surface 3b the bearing layer 3, powder 5 of a Pb-Sn alloy is attached to the surface of each particle integrated resin powders 4. The attached powder 5 has a good wettability with respect to the lubricating oil and is penetrated into pores 2a of the porous layer 2, together with the powder resin particles 4. In the other words, according to prior art, a bearing surface is formed by an overlay plating of Pb-Sn alloy. On the contrary, according to the invention, particles of Pb-Sn alloy powders 5 is attached in advance to the surface of each particle of the intgrated resin powders 4 before forming the bearing layer 3. In other words, the P T F E resin precipitate 6 is inert and does not chemically react with the Pb-Sn alloy powder, so that it is extremely difficult that the P T F E resin 6 is integrated with the Pb-Sn alloy powder 5. Furthermore, F E P resin precipitate 6 is superior to P T F E resin precipitate 7 in the fluidity in the melting point and also in adhesion with respect to the Pb-Sn alloy powder 5. The Pb-Sn alloy powder 5 has a good affinity with the particle of the integrated resin powder in which the two resin precipitates 6 and 7 are integrated as one unity. Therefore, the Pb-Sn alloy particles 5 can be retained by the integrated resin powder 4. Thus, the wettability of surface of integrated resin powder 4 can be improved by the attached Pb-Sn alloy powder 5. The cavitation resistance can be improved by the fact that F E P resin precipitate 7 adheres to the Pb-Sn alloy particle 5.

In case of forming the integrated resin powder, it is possible that the P T F E resin precipitate is in unity with the P F A resin precipitate or F E P resin precipitate and P F A resin precipitate, instead that the P T F E resin precipitate is in unity with the F E P resin precipitate. By addition of the P F A resin precipitate, excellent bearing layer can be obtained, because the wear resistance and cavitation resistance can be improves. The bearing layer 3 preferably consists of 75 to 95 vol % of integrated resin powder and 5 to 25 vol % of Pb-Sn alloy powder. Further, the integrated resin powder 4 preferably consists of 70 to 95 wt % of the P T F E resin precipitate and 5 to 30 wt % of the F E P resin precipitate and/or P F A resin precipitate, namely the F E P or P F E resin precipitate is in unity with the P T F E resin precipitate, This is because F E P or P F A resin precipitate provides the surface of bearing layer with excellent fluidity by melting it, at the time when seizure happens on the bearing layer and is superior in the mechanical strength to the P T F E resin precipitate, so that it is possible to improve the wear resistance, to improve the adhesion to the porous layer or Pb-Sn alloy powder or like and to improve the cavitation resistance property. In this case, if the amount of the F E P or P F A resin precipitate is less than 5 wt %, the mechanical strength and wear resistance are hardly improved. If the amount is above 30 wt %, the coefficient of friction in higher so that the lubrication property is spoiled.

The Pb-Sn alloy powder is added in order to improve the wettabililty of the P T F E, F E P and P F A resin precipitates with respect to the lubricating oil. This addition enhances such property that lubricating oil film is safely retainble on the bearing surface. If it's amount in the bearing layer is 5 vol % or below, the wettability can not be improved. If it's amount is 25 vol % or above, excellent property of the P T F E resin precipitate or the like is lost, the mechanical strength of the bearing layer is reduced, and the wear resistance is reduced.

The Pb-Sn alloy powder substantially consists of Pb and Sn. Preferably it contains 10 to 90 wt % of Sn and 10 to 90 wt % of Pb. If the content of Sn is 10 wt % or below, problems are raised in the corrosion resistance, e.g., corrosion by an organic acid that may occur when the lubricating oil is at a high temperature. If the content is 90 wt % or above, on the other hand, the mechanical strength and wear resistance of the resin layer are reduced.

Now, a method of manufacturing the bearing material of the above construction will be described.

At first, a petroleum system solvent, a surface active agent and alcohol are mixed to form a liquid mixture. The liquid mixture is added to the integrated resin powder (with an average particle size of 300 to 600) consisting of P T F E resin precipitate and F E P or P F A resin precipitate, thereby wetting the surface of each particle of integrated resin powder with the liquid mixture.

Next, Pb-Sn alloy powder (with an average particle size of 5 to 50$\mu$) is added to the integrated resin powder having wet surface thereon, thereby covering the surface of each particle of the integrated resin powder with the Pb-Sn alloy powder Also, the fluidity is improved, and the handling is facilitated, so that the integrated resin powder particles can be easily supplied and dispersed onto a porous layer by using a hopper or the like.

Subsequently, pressure is applied by using a roller to the integrated resin powder of which particle has its surface adhering to Pb-Sn alloy particles, thereby filling the pores formed between metal particles of the porous layer with the integrated resin powder. When the pressure filling is carried out, it is sufficient that an ordinary pressure is applied on particle of the integrated resin powder. Unlike the prior case, the surface of each particle of the integrated resin powders is wetted by the liquid mixture, so that each particle of integrated resin powders can be easily deeply inserted together with the Pb-Sn alloy powder attached to it into the pores of the porous layer without need of substantially increasing the roller pressure.

If desired, the solution used at the time of the wetting, e.g., petroleum solvent, was removed by heating the integrated resin powder, and then the integrated resin powder is sintered at 350° to 450° C., e.g., about 380° C., for 5 to 30 minutes to render the integrated resin powder into close contact with one another. Subsequently, dimensional adjustment is done by using roller, if desired, thus obtaining a bearing layer covering a porous layer.

At this time, the average particle size of the integrated resin powder particles preferably ranges 300 to 600. If the size is below 300, the particles receive shearing forces at the time of the mixing, so that particles are liable to be rendered to be fibrous. In this case, it is no longer easy to insert the integrated resin powder into pores of porous layer by an application of pressure on it. If the size is above 600$\mu$, on the other hand, homogenious mixing with the Pb-Sn alloy powders can not be obtained. Meanwhile, the average particle size of the Pb-Sn alloy powders preferably ranges 5 to 50. If the size is less than 5, the surface area of the Pb-Sn alloy powder is increased to reduce the mechanical strength of the bearing layer. If the size is above 50, homogenious mixing with the integrated resin powder can not be obtained.

EXAMPLE

Now, example will be given below.

Example 1

Figure 4:
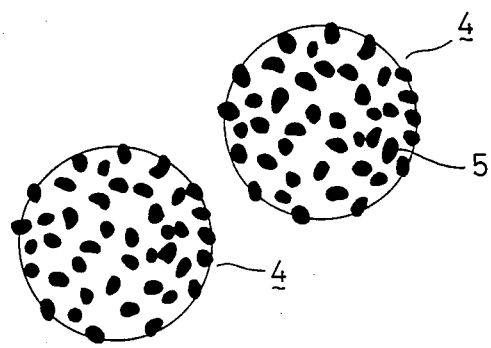
FIG. 4 is an enlarge-scale a front view showing an example of the integrated resin powder particle, a surface of which is covered by Pb-Sn alloy particles.

A solution consisting of 20 parts by weight of a petroleum-based solvent, 7 parts by weight of a surface active agent and 5 parts by weight of alcohol was added to 100 parts by weight of the integrated resin powder (consisting of 90 wt % of P T F E resin precipitate and 10 wt % of F E P resin precipitate) having a structure as shown in FIG. 3 and an average particle size of 500, and the mixture was agitated and the integrated resin powder was wetted with the above solution. This integrated resin powder was left for 24 hours for sufficient maturing. The integrated resin powders were thus sufficiently wetted by the solution containing the petroleum-based solvent to render at least the surface of the particles wet. Subsequently, powder of a Pb-Sn alloy powder with an average grain size of 30$\mu$ and containing 15 wt %, of Sn, the remainder being Pb, was added by 15 wt %, and the resultant system was agitated so that the integrated resin powders will not receive any shearing force. As a result, a resultant powder having a structure as shown in FIG. 4 could be obtained, in which the surface of each particle of integrated resin powders 4 was covered by Sn-Pb alloy powders 5 attached to it.

Subsequently, resultant powders were supplied at a constant rate from a hopper to be scattered on a porous layer (with a thickness of 0.3 mm) obtained by sintering Cu-Pb alloy powders (Sn 15 wt %, Pb 85 wt %) on a back metal, such as a steel plate with a thickness of 1.20 mm, as shown FIG. 2 to be pressure-inserted into the pores 2a of porous layer 2 by using a roller.

Afterwards, the solution of petroleum-based solvent or the like was removed by heating the system, followed by sintering at 380° C. for 10 minutes to render the particles of resultant powders to be contact with one another. Then, a dimensional adjustment was done by using a roller, thus obtaining a bearing material having a bearing layer therein (as shown as Sample No. 6 in Table 3).

Contrast Examples Nos. 7, and 8 and 9 are shown below.

(a) Contrast Example No. 7,

The integrated resin powder noted above was solely scattered on the above porous layer and pressure-inserted into, the pores of porous layer by appling a pressure by means of using a roller, and a bearing layer was formed under the same conditions as noted above.

(b) Contrast Example No. 8, 15 wt % of the Pb-Sn alloy powder noted above and 85 wt % of the P T F E resin powder mixed. The resultant mixture was then scattered on the porous layer noted above and inserted into the porous layer to form a bearing layer covering the porous layer in same manner as Contrast Example No. 7.

(c) Contrast Example No. 9

76.5 vol % of P T F E resin powder, 8.5 Vol. % of F E P resin powder and 15 vol. % of Pb-Sn alloy powder (Sn 15 wt %, Pb 85 wt %) were mixed. The resultant mixture was scattered directly onto the porous layer noted above. Next, the insertion of the mixture into the pores of the porous layer noted above was carried out by appling pressure onto the mixture, thereby forming a powder layer. The powder layer was sintered by heating it under same condition as noted above, thereby providing the bearing material corresponding to the contrast example No. 9.

The various bearing materials obtained in the above ways were tested under conditions shown in Table 1 to evaluate the load resistance property and the cavitation resistance property. Specifically, the test as to the load resistance property was carried out by accumulating load by 20 kgf/cm per hour with a low viscosity strut oil capable of being readily rendered to be in the boundary lubrication state, in which the counterpart material is in a direct contact with the bearing surface, without lubricating oil. At the same time, the test as to cavitation resistance property was conducted under conditions shown in Table 2 to evaluate the strength of the bearing layer.

Table 3 shows the results of tests. As is shown, the bearing materials according to the invention have excellent load resistance property, compared to the contrast examples Nos. 7, 8 and 9. Also, it was found that bearing materials related to the invention were superior in the cavitation resistance property, compared to the contrast examples Nos. 7, 8 and 9. Further, Samples No. 1 to No. 5 were produced as the bearing materials according to the invention by using various volume % of Pb-Sn alloy powder and the integrated resin powder. They were tested to find that the load capacity property and cavitation resistance property were the same in the Pb-Sn alloy powder range of 10 to 20 vol. %.

The reference of adjustment of cavitation resistance property in Table 3 is as follows.

A . . . substantially no change in appearence
B . . . bearing layer being partly removed
C . . . bearing layer being completely removed to expose the porous layer.

TABLE 1

| Applied on the bearing surface pressure | 20 to 200 kgf/cm$^2$, accumulated by 20 kgf/cm$^2$ for every hour |
|---|---|
| Speed: | 5 m/min |
| Lubricating oil | strut oil |
| Counterpart material | S45C H = 550.8 S |
| Test piece: | 35 cm by 35 cm by 1.5 cm |
| Temperature of Lubricant oil | 70 ± 5° C. |

TABLE 2

| Tester: | Acoustic wave oscillator |
|---|---|
| Oscillation frequency: | 19 KHz |
| Horn diameter: | φ25 mm |
| Clearance: | 1.3 mm |
| Agent Liquid: | water |
| Temperature of agent liquid: | 70 ± 10° C. |
| Output: | 300 W |
| Time: | 15 minutes |

TABLE 3

| Sample No | Composition (wt %) | | | | Pb—Sn alloy powder (Sn 15 wt %, Pb Bal) |
|---|---|---|---|---|---|
| | P.T.F.E | F.E.P | P.F.A | Total | |
| 1 | 85.5 | 9.5 | — | 95 | 5 |
| 2 | 81.0 | 9.0 | — | 90 | 10 |
| 3 | 76.5 | 8.5 | — | 85 | 15 |
| 4 | 72.0 | 8.0 | — | 80 | 20 |
| 5 | 67.5 | 7.5 | — | 75 | 25 |
| 6 | 76.5 | — | 8.5 | 85 | 15 |
| 7 | 90.0 | 10.0 | — | 100 | — |
| 8 | 85.0 | — | — | 85 | 15 |

TABLE 3-continued

| Sample No | Composition (wt %) | | | | Pb—Sn alloy powder (Sn 15 wt %, Pb Bal) |
|---|---|---|---|---|---|
| | P.T.F.E | F.E.P | P.F.A | Total | |
| 9 | 76.5 | 8.5 | — | 85 | 15 |

| Sample No. | Load resistance property(Kgf/cm$^2$) | Cavitation resistance property |
|---|---|---|
| 1 | 160-200 | A |
| 2 | 180-220 | A |
| 3 | ↑ | A |
| 4 | ↑ | A |
| 5 | 160-200 | B |
| 6 | 180-220 | A |
| 7 | 160-180 | A |
| 8 | 140-180 | C |
| 9 | 140-180 | B |

EXAMPLE 2

As in Example 1, 20 parts by weight of a petroleum-based solvent, 7 parts by weight of a surface active agent and 5 parts by weight of alcohol were added to 100 parts by weight of the integrated resin powder (consisting of 81 wt % of P T F E resin precipitate and 9.0 wt % of F E P resin precipitate) having a structure as shown in FIG. 2 and an average grain size of 500μ, and the mixture was agitated. As a result, the integrated resin powder having it's surface wetted by the solution was obtained. The resultant integrated resin powder was left for 24 hours for sufficient maturing, whereby each particle of the integrated resin powder was sufficiently wetted at least for it's surface penetrated by the solution. Thereafter, five different kinds of Pb-Sn alloy powder respectively containing 10, 30, 50 and 70 wt % of Sn and with an average grain size of 30μ, were added by 10 wt %, to the integrated resin powders, and the resultant mixture were agitated so that each particle of the integrated resin powder will not receive shearing force. As a result, a structure as shown in FIG. 4 could be obtained, in which the surface of each particle of the integrated resin powder was covered by Pb-Sn alloy powders attached to it.

Then, the resultant powders were supplied at a constant rate from a hopper to be scattered over the porous layer noted in Example 1. Such scatter was followed by an insertion of the resultant powders into pores of the porous layer, by means of appling a pressure on the resultant powder using a roller.

Then, the solution were removed by heating the system, followed by sintering at 380° C. for 10 minutes to make the particle of the resultant powders into close contact with one another. Further, dimensional adjustment is done using a roller. Thus, bearing materials having a bearing layer therein (i.e., Samples No. 10, 11, 12, 13 and 14 as shown in FIG. 4 ) could be obtained.

The bearing materials obtained in this way were tested under test conditions as shown in Table 1 to evaluate the load resistance property and cavitation resistance property. Specifically, test as to load resistance property was carried out by accumulating load by 20 kgf/cm for every hour with a low viscosity strut oil capable of being readily rendered to be in such boundary lubrication state as noted in Example 1. At the same time, test as to cavitation resistance property was conducted under conditions shown in Table 2 to evaluate the strength of the bearing layer.

Table 4 shows test results. With the bearing materials according to the invention, the load resistance property is increased with increase of the Sn content, thus showing excellent cavitation resistance property. The most preferred range of the Sn content was 30 to 70 wt %.

TABLE 4

| Sample No. | Composition of Pb—Sn alloy powder | | Load resistance capacity (Kgf/cm$^2$) | Cavitation resistance property |
|---|---|---|---|---|
| | Sn(wt %) | Pb(wt %) | | |
| 10 | 10 | 90 | 180-220 | A |
| 11 | 30 | 70 | 220 or above | A |
| 12 | 50 | 50 | 230 or above | A |
| 13 | 70 | 30 | 230 or above | A |
| 14 | 90 | 10 | 180-220 | A |

What is claimed:

1. A bearing material including a back metal, a porous sintered metal layer having a large number of pores therein and covering said back metal and a bearing layer formed on said porous sintered metal layer such as to partly penetrate into said pores of said porous sintered metal layer, in which said bearing layer consists essentially of an integrated resin powder and Pb-Sn alloy powder adhering to each particle surface of said integrated resin powder, said integrated resin powder being formed by simultaneous precipitation of tetrafluoroethylene resin and tetrafluoroethylene-hexafluoropropylene copolymer and/or tetrafluoroethylene-perfluoroalkylvinylether copolymer.

2. The bearing material according to claim 1, in which said back metal is formed by a steel plate.

3. The bearing material according to claim 1, in which said integrated resin powder contains 70 to 95 wt % of tetrafluoroethylene resin precipitate.

4. The bearing material according to claim 1, in which said bearing layer contains 75 to 95 wt % of said integrated resin powder and 5 to 25 wt % of said Pb-Sn alloy powder, and said Pb-Sn alloy powder contains 10 to 90 wt % of Sn.

5. The bearing material according to claim 1, in which said integrated resin powder comprises at least one particle having an average grain size of 300 to 600μ, and said Pb-Sn alloy powder comprises at least one particle having an average grain size of 5 to 50μ.

6. A method of manufacturing a bearing material comprising steps of:
   scattering and sintering metal or alloy powder on a back metal to form a porous sintered metal layer having pores between particles of said metal or alloy powder on said back metal;
   wetting a surface of each particle of integrated resin powders with a solution containing an organic solvent;
   said integrated resin powders being formed by simultaneous precipitation of a tetrafluoroethylene resin and a tetrafluoroethylene-hexafluoropropylene copolymer resin and/or a tetrafluoroethylene-perfluoroalkylvinylether resin;
   adding Pb-Sn alloy powders to said integrated resin powders, thereby attaching said alloy powders to the surface of each particle of said integrated resin powders to form a powder mixture; and
   scattering said powder mixture on said porous sintered metal layer allowing a partial penetration into pores of said porous sintered metal layer, so as to form a powder layer on said porous sintered metal layer; and
   then heating said powder layer to form a bearing layer.

* * * * *